United States Patent [19]

Fox

[11] Patent Number: 5,092,233
[45] Date of Patent: Mar. 3, 1992

[54] TRASH COLLECTION AND STORAGE SYSTEM

[75] Inventor: Anthony Fox, Bloomington, Minn.

[73] Assignee: Marcella M. Fox, Bloomington, Minn.

[21] Appl. No.: 658,795

[22] Filed: Feb. 19, 1991

Related U.S. Application Data

[62] Division of Ser. No. 477,331, Feb. 8, 1990, abandoned.

[51] Int. Cl.⁵ .............................................. B30B 13/00
[52] U.S. Cl. ...................................... 100/38; 62/341; 100/92; 100/99; 100/215; 100/218; 100/229 A; 232/43.2; 414/798
[58] Field of Search ................. 100/38, 92, 93 P, 215, 100/218, 229 A, 91, 99; 414/21, 398, 786; 62/341; 220/908; 232/43.1-43.5, 44

[56] References Cited

U.S. PATENT DOCUMENTS

| | | | |
|---|---|---|---|
| 1,688,271 | 10/1928 | Finch | 232/43.3 X |
| 3,514,969 | 6/1970 | Harza | 100/93 P X |
| 3,538,844 | 11/1970 | Howard | 100/218 X |
| 3,650,120 | 3/1972 | Harza | 100/93 P X |
| 3,659,427 | 5/1972 | Harza | 100/93 P X |
| 3,691,943 | 9/1972 | Boyd | 100/215 |
| 3,748,820 | 7/1973 | Fox | 100/229 A X |
| 3,754,501 | 8/1973 | Horn | 100/99 |
| 4,044,569 | 8/1977 | Harza | 100/93 P X |
| 4,071,991 | 2/1978 | Hulligan | 232/43.2 X |
| 4,220,014 | 9/1980 | Connors | 100/92 X |
| 4,987,988 | 1/1991 | Messina et al. | |
| 5,016,197 | 5/1991 | Neumann et al. | 100/99 X |
| 5,044,870 | 9/1991 | Foster | 414/798 |

FOREIGN PATENT DOCUMENTS

| | | | |
|---|---|---|---|
| 0055236 | 6/1982 | European Pat. Off. | 100/92 |
| 8105136 | 6/1983 | Netherlands | 100/92 |

*Primary Examiner*—Harvey C. Hornsby
*Assistant Examiner*—Stephen F. Gerrity
*Attorney, Agent, or Firm*—Haugen and Nikolai

[57] ABSTRACT

An unique automated and comprehensive through-the-wall trash handling and storage system and process which are disclosed in material to be discarded is loaded into a through-the-wall system from within and picked up by a hauler from outside an associated building. The invention contemplates embodiments of an integrated trash handling and storage system which accommodates all types of trash and many levels of automation and eliminates many of the prior art problems associated with sorting and sanitation in the handling and the storage of trash prior to disposal.

20 Claims, 9 Drawing Sheets

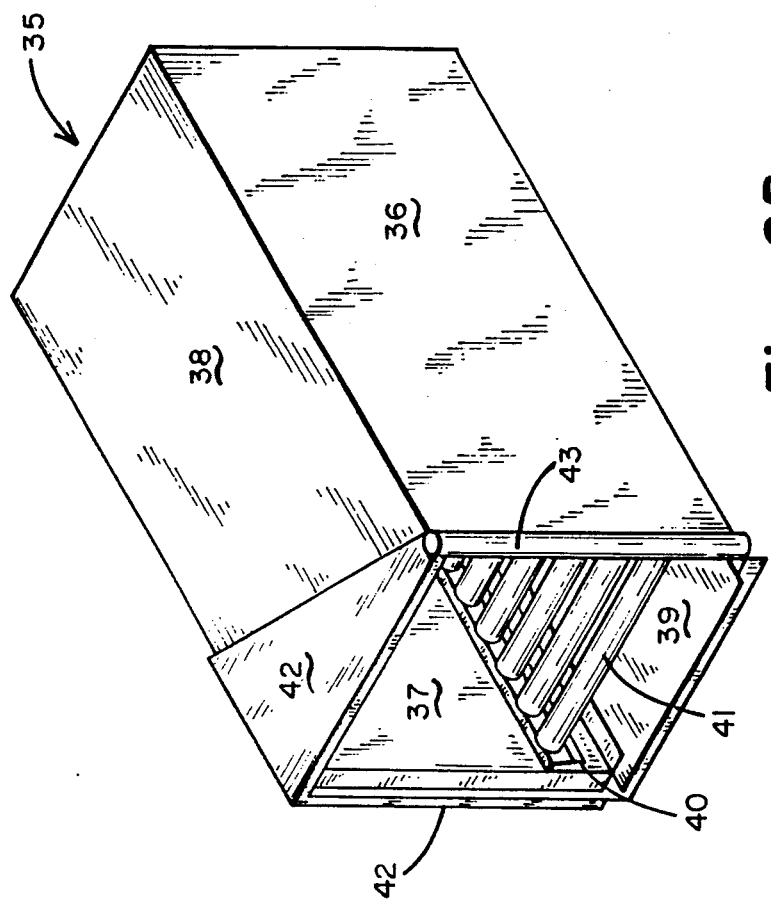
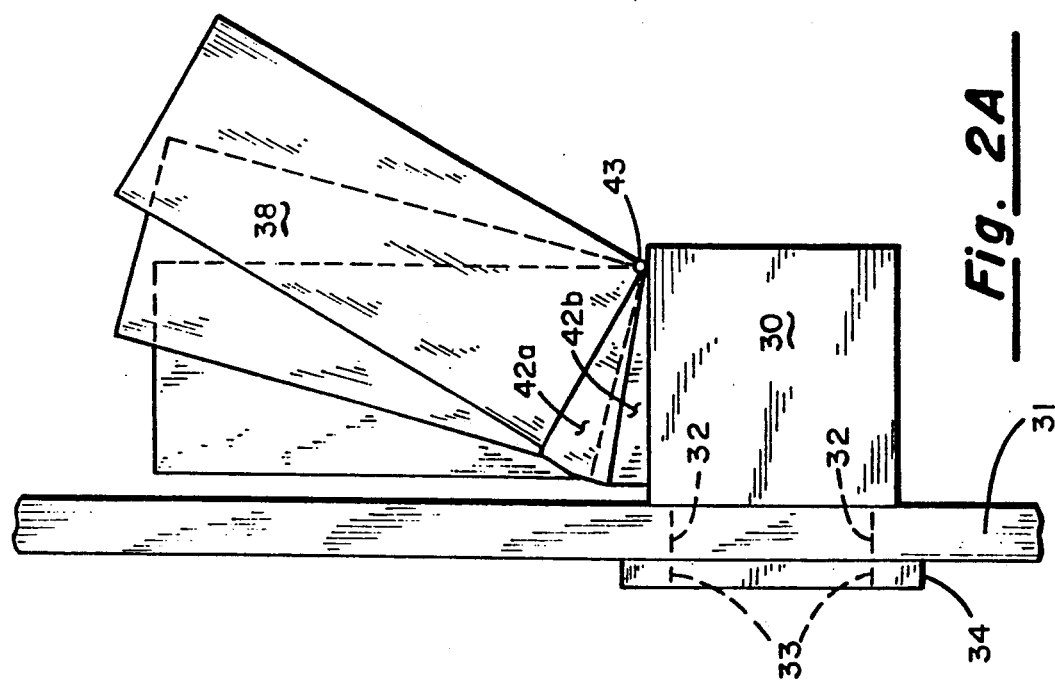
Fig. 2B
Fig. 2A

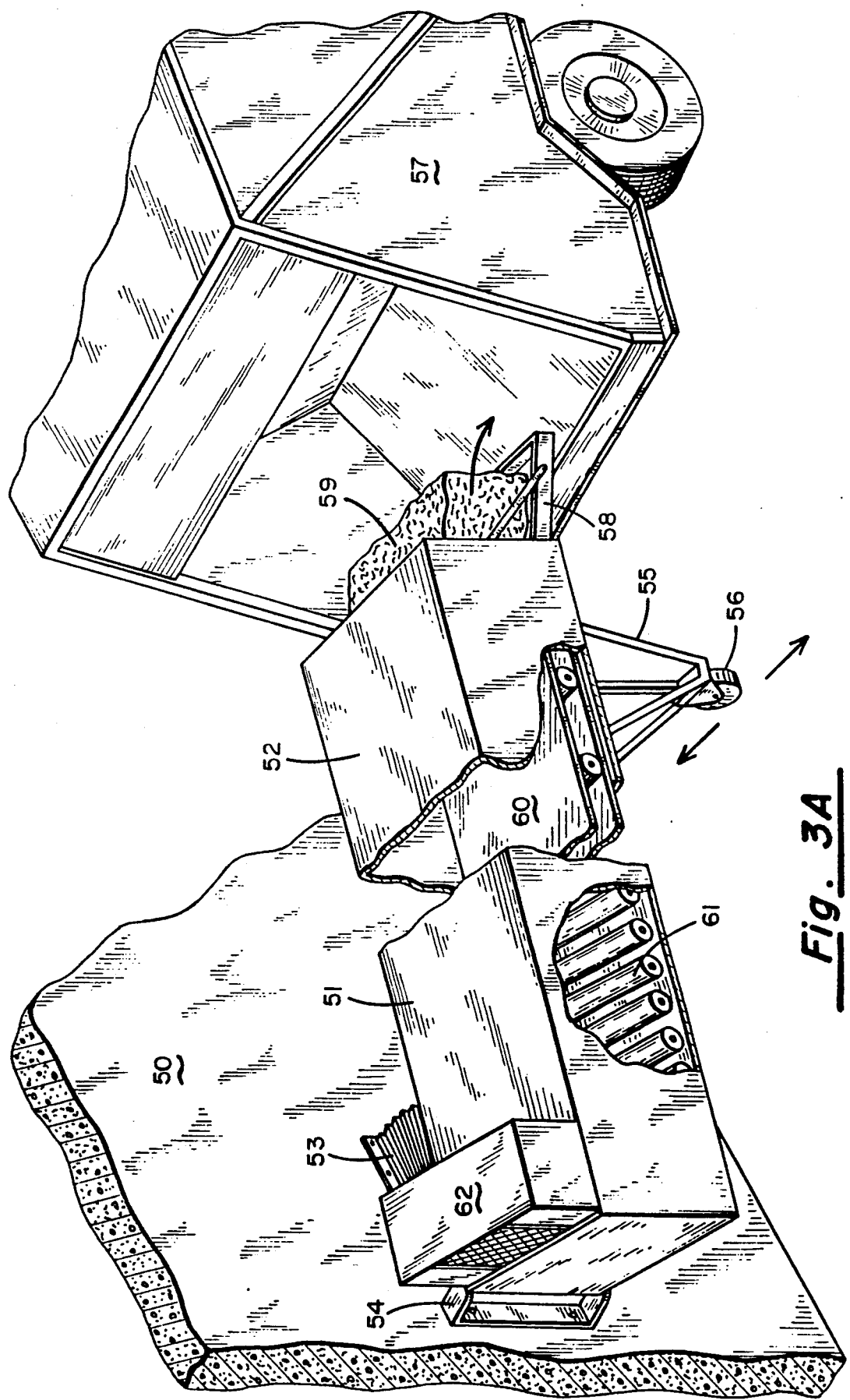

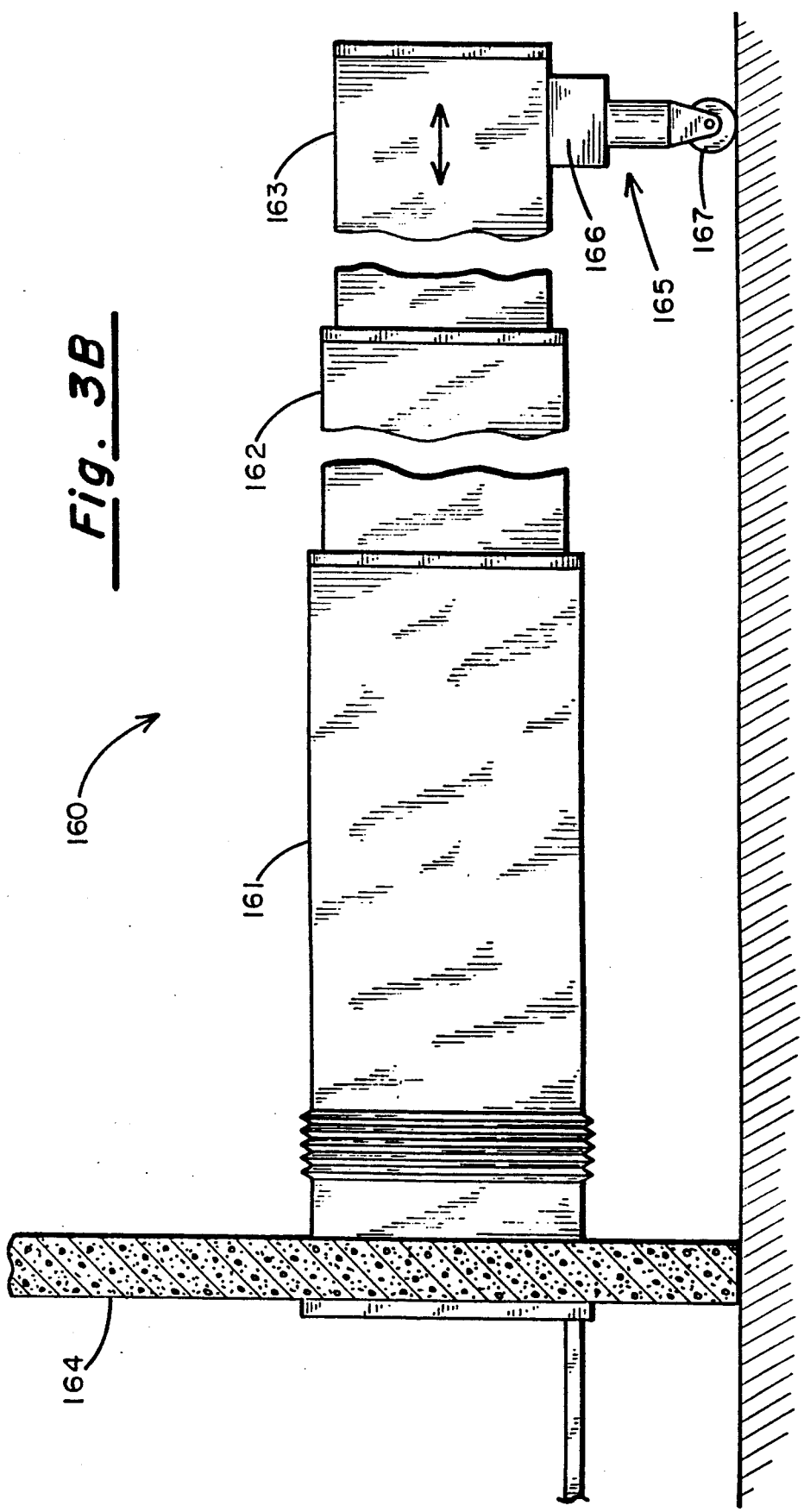

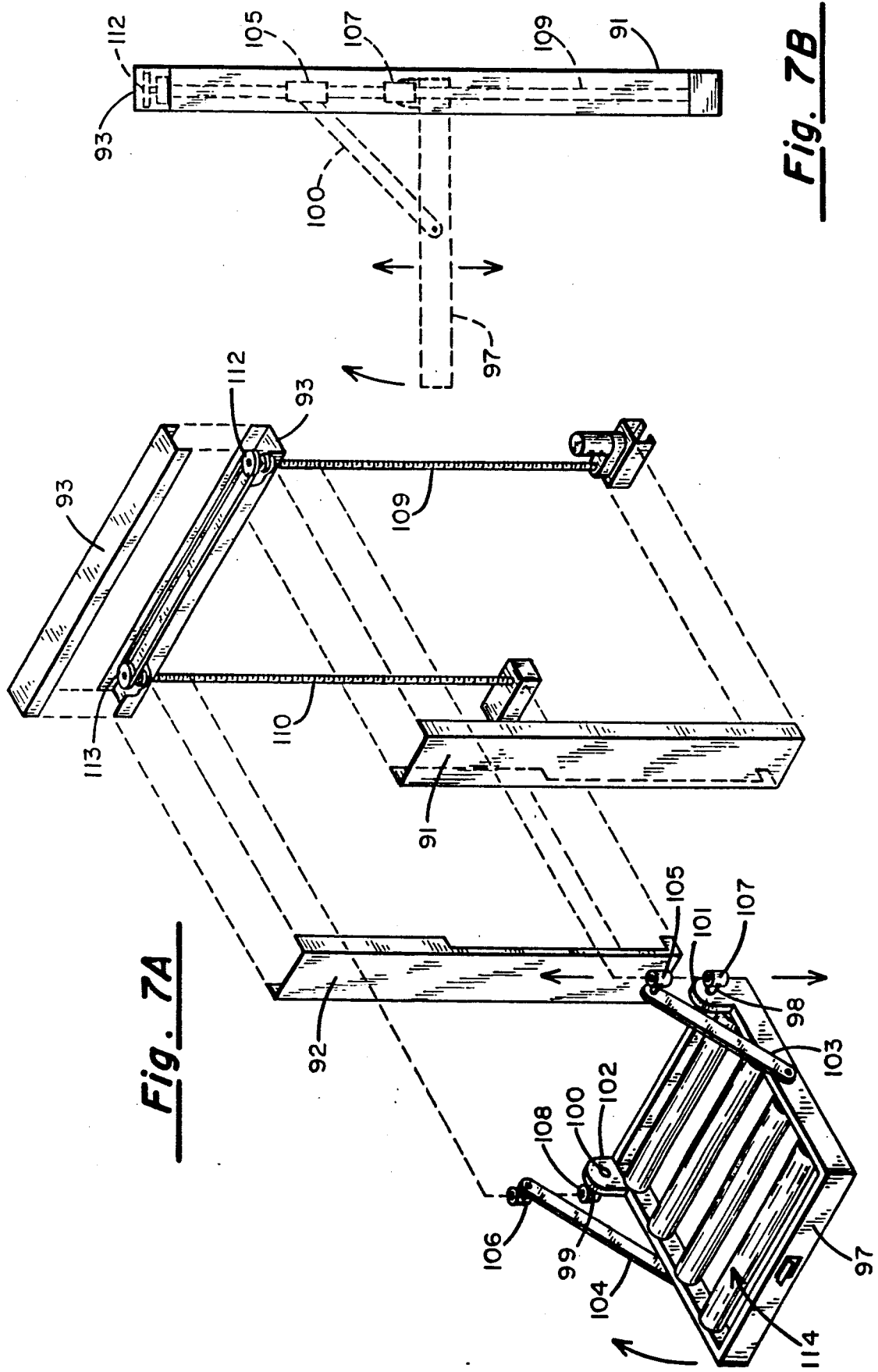

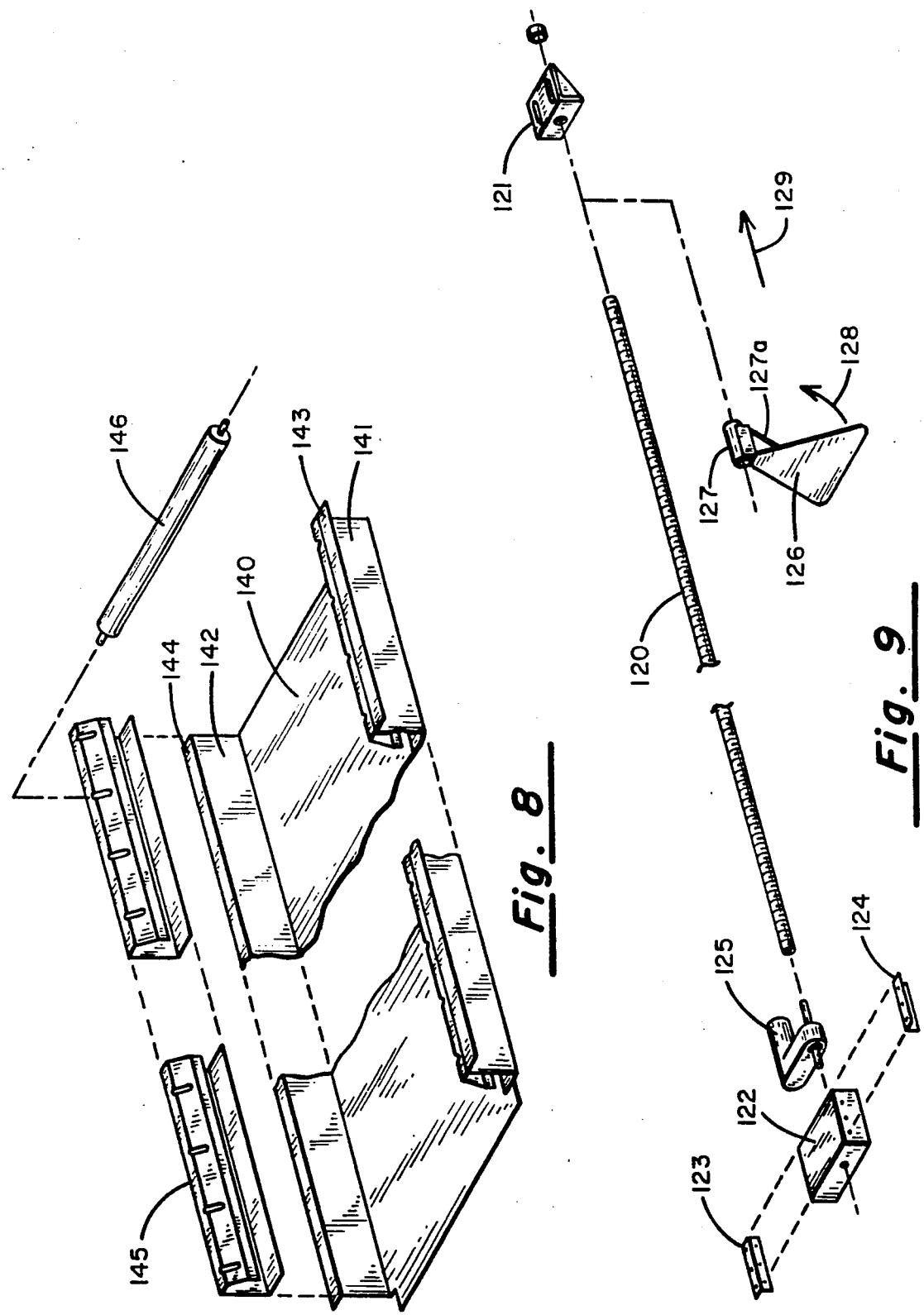

TRASH COLLECTION AND STORAGE SYSTEM

This is a divisional of copending application Ser. No. 07/477,331, filed on Feb. 8, 1990 (abandoned).

BACKGROUND OF THE INVENTION

I. Field of the Invention

This invention relates generally to the compacting, storage and removal of trash for industrial or commercial enterprises and multi-unit residential buildings, and more particularly, to a automated comprehensive trash compacting, storage and handling system which includes a through-the-wall storage container directly accessible for loading from the inside and for disposal from the outside of a building.

II. Description of the Related Art

A wide variety of machines for the collection, compaction and storage of trash and refuse are available commercially and are disclosed in the literature. This includes many types and models of machines for compacting or baling trash along with various types of storage containers. These include the familiar steel dumpster located behind commercial buildings which have loosely fitting hinged lids and which are designed to be lifted by side ears and dumped periodically into compatibly designed hauling trucks. These systems require the compacted or uncompacted refuse, including paper and other solid waste together with garbage, to be hauled, usually by hand, from the building to the holding container where it may reside for several days prior to being removed. While this presents no particular problem with paper or other inert solid waste materials, this may lead to unsanitary conditions with respect to garbage or other refuse which spoils readily causing odors and attracting rodents, insects and other unwanted pests.

Available landfills for the disposal of garbage and solid wastes are rapidly being depleted and it is already apparent that within the foreseeable future the cost for disposing of garbage and solid waste materials will skyrocket; in some areas, landfills will be unavailable entirely. Even at this writing it is known that some restaurants and other food handling establishments have been forced to close because they could not cope with rising waste costs. This means that soon compaction, sorting and recycling will no longer be novelties or voluntary conservation efforts but will be the required modes of operation.

Commercial establishments dealing with food or garbage types of refuse which readily breed unsanitary conditions will no longer be able to simply store such wastes in open or flip-top metal containers behind the service establishments. It is contemplated that soon storage facilities for such refuse will have to be segregated, sealed and even refrigerated to maintain sanitary conditions on the premises. In some jurisdictions, apparently, this may be the law.

In addition to the rapidly increasing costs for disposing of waste materials in landfills, or the like, charges to commercial establishments for such services are usually made based on the frequency of pick-up and the volume, i.e., number of cubic yards of material based on the capacity of the dumpster. In some cases, the full charge is made regardless of the actual amount of material in the dumpster. Haulers charging by volume of material transported have been traditionally opposed to the use of trash compactors simply because they reduce the total volume of materials hauled. More recently, however, there has been evidence of an increasing trend toward utilizing weight as the criteria for refuse collection rather than volume. In this vein, the use of compaction as a part of an overall refuse treatment process is rising rapidly as the reduced volume is no longer a drawback to generating revenues for the haulers.

In view of the increasing pressure on landfills and other means of trash and refuse disposal, and the demand for recycling and more sanitary treatment of garbage, a great need exists for the provision of a comprehensive garbage and refuse treatment system which addresses the handling, storage and disposal of material in a manner which accommodates recycling and provides a sanitary and environmentally acceptable alternative to those in existence today.

SUMMARY OF THE INVENTION

By means of the present invention, many problems associated with the processing, handling and storage of trash and garbage pending disposal are solved by an unique automated and comprehensive through-the-wall trash handling and storage system which is accessible for loading material to be discarded from within and to a hauler from without an associated building. The invention contemplates embodiments of an integrated trash handling and storage system which will accommodate all types of trash and many levels of automation and will eliminate many of the prior art problems associated with sorting and sanitation in the handling and the storage of trash prior to disposal.

The present invention provides an elongated enclosed holding container for receiving, storing and discharging trash which is attached to the user's building at or near one end and is provided with a discharge system at the other end designed to discharge the trash into a hauling truck. An opening in the building wall preferably substantially congruent with a side or end opening at or near the receiving end of the container allows the direct loading of the container from inside the building. The container may consist of a single unit or a series of modular sections disposed in end-to-end fashion or even telescoped to provide a variable holding volume. Each unit may be single or multi-level. The container is preferably made to be freely horizontally pivotal with respect to the building on a movable support so that it requires a minimum space next to the building wall and can be pivoted away from the wall for better access by the hauler. It is also preferably vertically pivotal to provide an adjustable discharge height to better accommodate a variety of hauling systems.

In a preferred embodiment the trash loading system includes a vertically pivoting trash receiving door mounted on a horizontal axis which opens outward to a horizontal disposition exposing the opening in the container on the other side of a wall. The door, when opened to a horizontal position, can accommodate trash such as parcels including bales, boxes, bags and cubes from a trash compactor atop its inner surface, which may carry a series of spaced rollers or other conveying system. The access door horizontal mounting axis is also preferably vertically adjustable such that trash may be loaded on the door at any desired level and loaded from the door to a support means inside the container at one or more different levels. The storage volume within the enclosed holding container includes one or more levels for supporting parcels of compacted trash, possibly separated by type, and such support may include a series of spaced powered or unpowered rollers or a powered or unpowered belt conveyor.

One embodiment of the invention is directed to a fully automated mechanized trash processing system in which the trash to be handled consists of bales or other parcels of compacted trash segregated as to content and loaded from inside a building through an opening into a storage container which preferably has the ability to index such trash on a multiplicity of levels. The storage container is then accessed by a waste hauling truck from outside the building in a manner which automates proper disposal of each type of waste involved.

The invention is further directed to the mechanization and automation of the various operations involved in implementing the basic through-the-wall idea. This includes the transfer of compacted bales, boxes, bags, bundles or cubes of trash to the loading platform, the mechanized automatic loading of the trash into the storage container including the indexing thereof, the support and transport or propulsion of the trash through the container from the entry to the discharge end and the discharging operation for the trash into the hauling truck including the indexing of the discharge of the various types of waste material. The automated control of the system also contemplates limited access both from within and without the building in the form of automatic encrypted access for both the loading and discharging of trash. The system encompasses automatic counting of or weighing of the bales by using the entry door as a scale or by other means, keeping a running total of the amount and, if necessary, the amount of each type of trash contained in the container, possibly by weight or by number of parcels loaded.

The system may provide an output with regard to the need for discharging trash or even automatically calling for the collection of one or more types of trash as through an RF signal transmitting system. Such a communication system may also respond to inquiries by haulers as to the loading status of the system. The information may be reported by printed receipt or other desired means to verify trash amount, date, time or other relevant data for invoice papers.

Preferably the storage containers are parallelpipeds in shape and of modular construction consisting of one or more modular sections which can be assembled according to the needs of the user. If the space occupied by the storage container is of concern, the plurality of modular sections may be constructed in a telescoping fashion such that capacity may be increased as required prior to discharge.

In addition, the container is preferably provided with a space conditioning means for maintaining a desired temperature within the container for storage of the trash to meet any garbage refrigeration or other legal requirements. The integrity of the container of the system can also be made as rigorous as required with respect to separation from the environment. This includes making the bottom section leak proof and providing a drain means, if necessary, in the bottom of the storage section to drain off any liquid which might leak from punctured bags or other refuse parcels. Wash down systems can be provided if desired. Containers can even be constructed with fire doors that can close to make the container airtight to extinguish any fires which might occur within the storage container due to unforeseen problems.

The discharge end of the container also contemplates an accessible door means and, in the preferred embodiment, the pivotal end of the container is made adjustable with respect to its height so that the discharge may be made at any level from any of a multiplicity of container support levels.

IN THE DRAWINGS

FIGS. 2A and 2B illustrate a pivot compensating sealing system and modular container for a end entry configuration such as illustrated in FIG. 1A;

FIG. 3A is a perspective view illustrating additional and fragmentary alternative details of containers in accordance with the invention;

FIG. 3B shows a side elevational view partially in section of still another embodiment;

FIG. 7A is an exploded perspective view of an alternative embodiment of the door assembly for which FIG. 7B shows a side elevation detail;

FIG. 8 is an exploded perspective view illustrating a container bottom assembly in accordance with the invention; and FIG. 9 depicts a further exploded perspective view illustrating a retracting pusher mechanism for urging parcels of trash along in one direction within the container of the invention.

DESCRIPTION OF THE PREFERRED EMBODIMENT

Figure 1B:
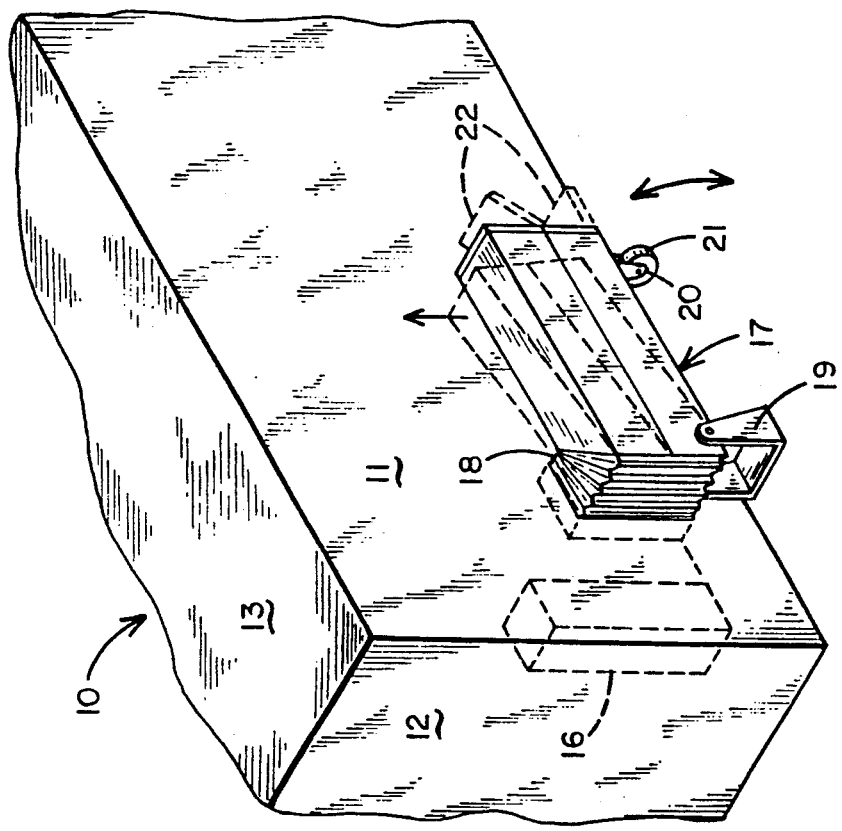
FIGS. 1A and 1B are perspective representations of alternate approaches to the trash handling and storage system of the invention with respect to addressing a building for through-the-wall disposal of trash.
Figure 1A:
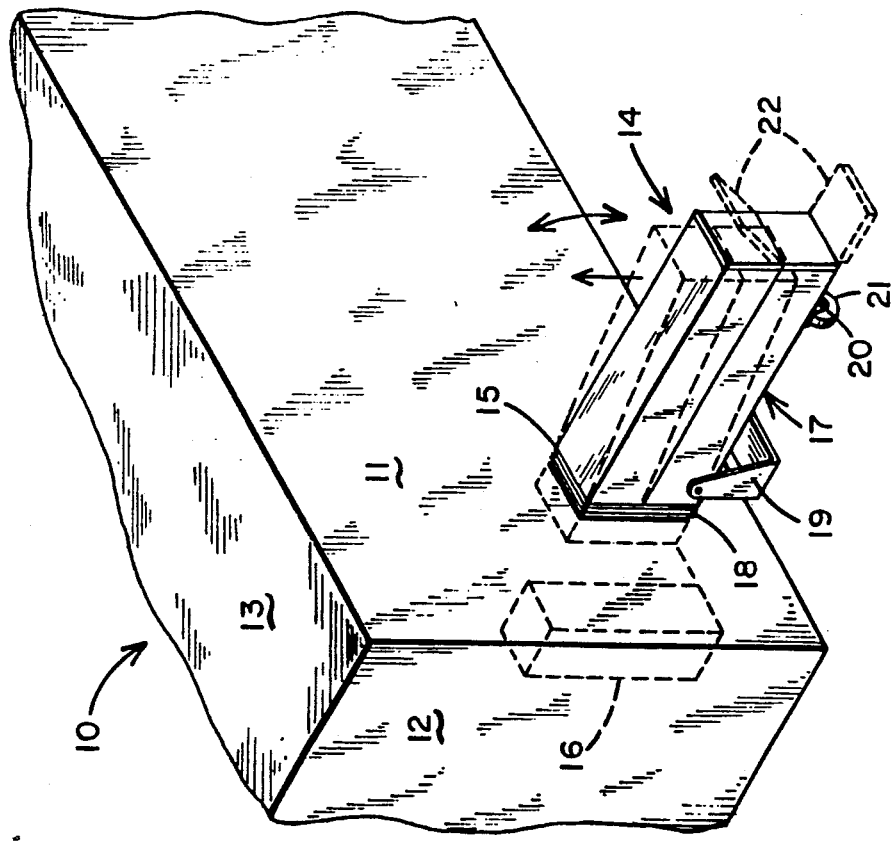

The invention will now be described with particular reference to the illustrative figures. FIGS. 1A and 1B are perspective representations of the general concept of the through-the-wall trash handling and storage system of and how it is preferably disposed with respect to the building it serves. A building corner fragment is shown generally at 10 and includes side and end walls 11 and 12 together with a roof fragment 13. The container for receiving, storing and discharging refuse is shown generally at 14 with an open end 15 fixed with respect to and addressing an opening (not shown) in the building wall 11 where it can address a trash compactor indicated by the dotted structure 16.

The container contemplates a substantially rectangular parallelpiped-shaped structure 17 which attaches to the wall 11 of the building using an adjustable seal such as the accordioned member 18 which enables the outward end of the container 17 to pivot from a position parallel to the wall to one perpendicular to the wall if required. The system can be connected to the wall 11 through an end or side mount and a transition chamber can be provided if desired.

The system generally further includes an inward support means as at 19, although the container 17 may also be supported directly from the wall 11, and an outer support 20 including a wheel as at 21 to allow for pivotally adjusting the container 17 with respect to the wall 11. As illustrated by the dotted phantom representation together with the vertical arrows in FIGS. 1A and 1B the system is also designed to be vertically pivotal with respect to the wall 11 so that the height of the outbound end can be adjusted to accommodate any desired height for discharge to a corresponding hauling system. A pivotal discharge door 22 is also shown. Details of the system are described in greater detail below.

FIG. 2 depicts one embodiment of an end-attached storage container system in which an initial trash receiving ante chamber 30 is fixed to a building wall 31 having an opening indicated by 32 which matches an inner door opening 33 in frame 34. The modular container is shown generally in perspective at 35 in FIG. 2B and is shown is schematic top-view form in FIG. 2A. The modular structure 35 includes a pair of side walls as at 36 and 37, a top panel 38 and bottom panel 39 which form a parallelpiped shape. The module includes a trash support roller conveyor, illustrated by roller support 40 together with rollers 41, which extends the full length of the modular section and may be one of several such conveyors mounted at different heights in the modular section 35. The top 38 and side 37 are provided with a series of overlapping bent triangular plates as at 42a and 42b (FIG. 2A) which overlap top member 38 and side member 37 but which fan out, as shown in FIG. 2A. As the container 35 is pivoted away from the wall 31 to maintain the sealed integrity of the system. Members as 42a and 42b pivot about a vertical pivotal axis illustrated at 43, as the container 35 itself rotates about the axis 43. The front end of the container including the front end of top member 42 remains fixed to the chamber 30 and the series of plates simply fan out to cover the top and side opening to maintain the integrity of the system.

FIG. 3 illustrates fragments of additional contemplated embodiments which may be used to accomplish the objectives of the invention. A building wall 50 is shown to which any of several types of containers, or containers having different support and conveying systems, as at 51 and 52 may be attached. Accordion system 53 operates in conjunction with a pivotal mounting 54 to allow the container 51 or 52 to pivot with respect to the building as enabled by carriage 55 with wheel 56 mounted thereto. The fragmentary views of the side mounted containers 51 and 52 are intended to be illustrative of alternative embodiments of similar modules.

The system connects the interior of the building through an opening in wall 50 substantially congruent with 53 to receive trash and to discharge trash accumulated over time in the storage volume into a hauler receptacle such as illustrated by the fragmental section of a refuse truck 57. Thus, door 58 opens to allow parcel 59 to move as from the conveyor 60 of trash container 52 to the truck.

The system container is preferably provided with a space conditioning means which illustrated at 62 in FIG. 3A and which is designed to automatically control the temperature within the container as required to comply with any storage codes which might apply to the system. This would include refrigeration of garbage during the summer months and/or preventing freezing of the system in the winter, if applicable. The use and operation such system generally is well-known.

FIG. 3B illustrates a telescoping embodiment in which telescoping modular sections 161, 162 and 163 extend from fragmentary wall section 164. The sections can be extended or retracted as necessary for time variable storage capacity. A completely mechanized carriage wheel system is shown at 165 which can also be used with any of the other embodiments where mechanization and automation of the movement of the storage container is desired. The system includes a motor and drive system represented by 166 which connects to a wheel 167 which is mounted to both pivot and rotate. The system is also made height adjustable as by a driven rotating screw or the like.

Figure 4:
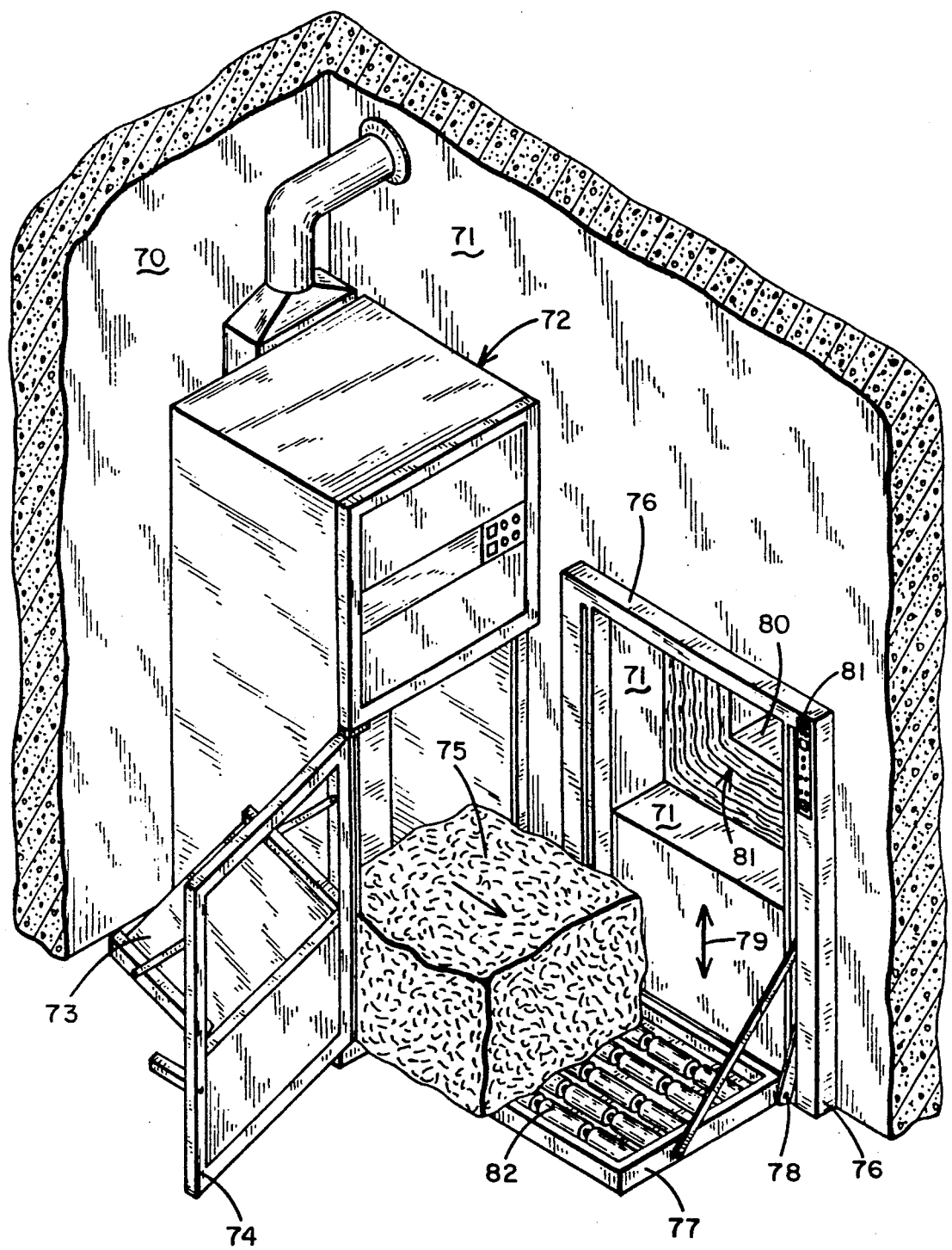
FIG. 4 depicts one mode of transfer loading of trash into the system coordinated with a compactor.

FIG. 4 is a further illustration in perspective of a contemplated mode of charging the system of the invention which is coordinated with a trash compaction device. The figure includes fragmentary wall sections 70 and 71 which meet to form a corner in which a trash compaction device 72 is installed. The compaction device may be one which is commercially available such as a Pollution Packer TM manufactured by the TFC Corporation of Bloomington, Minn. In that system trash is loaded through a vertically pivoting door 73 within in a larger discharge door 74, is compacted by a vertical ram, not shown, usually within a plastic enclosure such as a bag, or using bale straps to form an enclosed parcel or bale of trash as illustrated at 75. The parcel 75 is discharged from the door 74 at a level quite close to the floor.

One loading device in accordance with the present invention includes a door frame 76 having a door 77 mounted from it which pivots about an horizontal axis on hinges at 78 and which mounts on an assembly which, at the same time, is itself vertically adjustable as indicated by the arrow 79 and as will be discussed in greater detail in conjunction with FIGS. 6, 7A and 7B below. The door 77 accesses the interior of the trash storage container of the invention through congruent openings in the building wall 71 and in the storage container 80. Accordion joint 81 accommodates both horizontal and vertical pivoting of the container. The door 77 is further provided with spaced parallel gravity rollers 82 which provide a support and loading platform for the parcel 75. The door 77, when opened, can be adjusted vertically to accommodate the parcel as it is discharged from the compactor 72, support and lift it to a height commensurate with the support and conveying structure desired for the parcel within the container and thereafter can be tilted so that the parcel is conveyed by the rollers 82 into its proper place in the container. The door thereafter closes to seal the inside of the container from the inside of the building.

Hand operated pushbutton control may be provided as illustrated by the panel 81. Access may be limited by a code which must be entered to enable one to operate the door. The door 77, also may be the platform of a scale and weigh the parcel after it is discharged from the compactor 72 so that the weight of each parcel of trash may be recorded and utilized.

Figure 6:
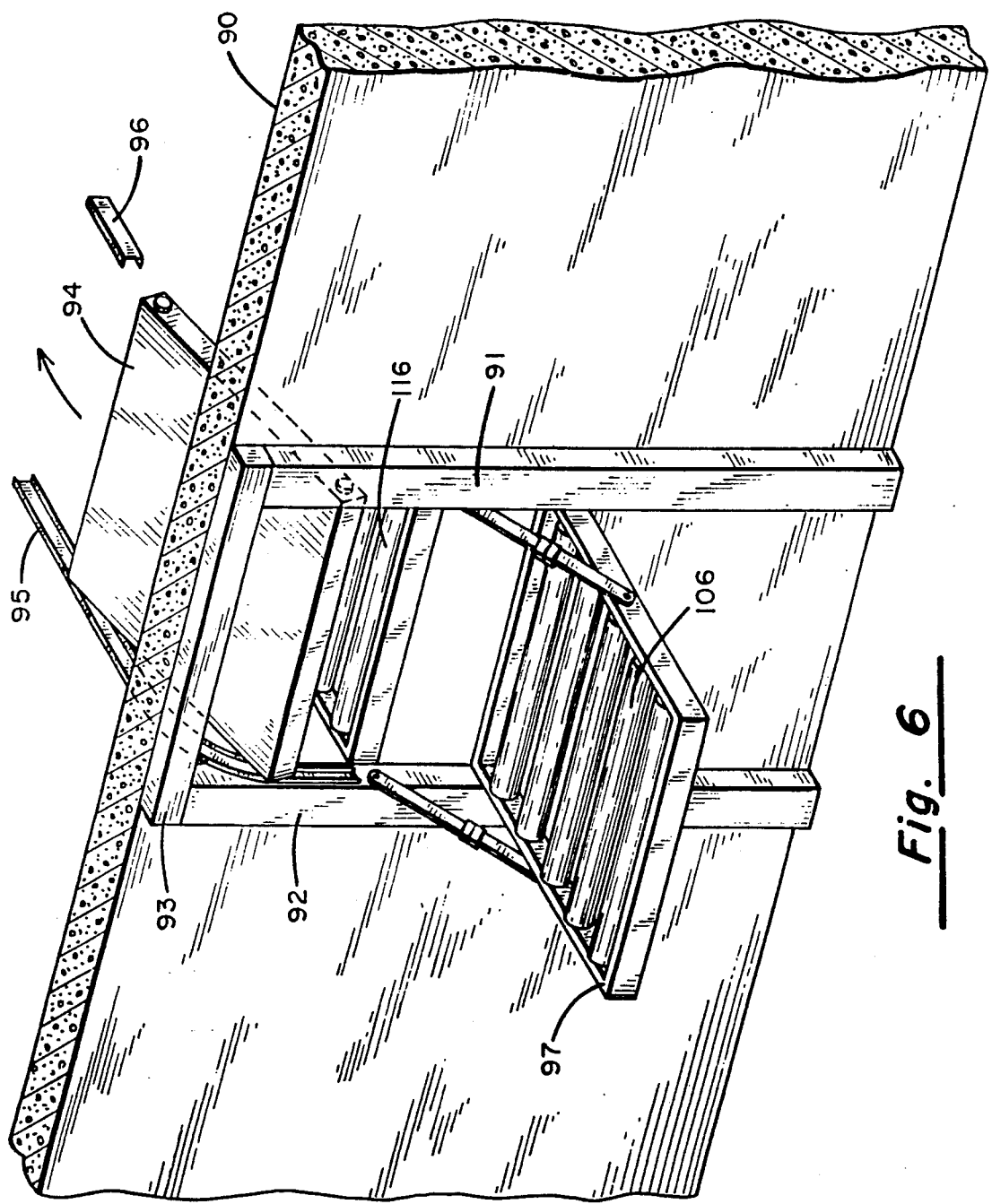
FIG. 6 depicts, in perspective, an alternative loading door embodiment.

FIGS. 6 and 7 further illustrate details of embodiments of the door accessing the container from within the building. FIG. 6 includes fragmentary wall section 90 having an opening therein framed as by a frame having vertical members 91 and 92 and horizontal member 93 depicts a two-component door or closure system for the opening including an overhead door 94 which operates on overhead door track 95 cooperating with a track fragment which is shown at 96. Of course, when closed, door 94 seals the top portion of the opening defined by the frame. The second operable door platform member 97, as is more readily ascertained with reference to FIGS. 7A and 7B, is mounted so as to pivot vertically about horizontal axes as at 98 and 99 through holes as at 100 in attachment ears 101 and 102. The amount of pivotal travel is limited by support members 103 and 104. Sets of internally threaded mounting members including upper members 105 and 106 and lower members 107 and 108 are provided in conjunction with rotating threaded members 109 and 110 which are cooperatively mechanically driven as by belt 111 in conjunction with pulleys 112 and 113 in a well-known manner to rotate members 109 and 110 in unison to raise and lower the pivot point of the door 97 along the members 109 and 110. This allows positive adjustment of the fully open horizontal level of the door 97 such that a parcel of trash supported on rollers 114 can be raised or lowered to accommodate the height of the rollers as at 116 in the container and thereafter transferred directly to rollers 116 or rollers at any other desired height. The operation of the system is also depicted in the illustration of the FIG. 7B.

A container bottom construction in accordance with the present invention is illustrated by the exploded perspective view of FIG. 8. By that illustration it can be seen that a continuous bottom member 140 is provided having side edges 141 and 142 bent upon themselves upward at 90° and thereafter flared at 90° to form further horizontal sections 143 and 144 upon which specially bent sheet metal mounts as at 145 can be mounted to accommodate rollers as illustrated at 146. The bottom structure is sufficiently rigid to eliminate the need for further structural members while, at the same time, creating a box-like structure which prevents leakage of liquid or other materials through the bottom of the container. The double bending of the member 140 not only forms sides which are leakproof and accommodate the roller mounting members 145 but also imparts the necessary structural strength to the integrity of the system.

FIG. 9 illustrates a device for urging parcels of trash along within a container having unmechanized roller platforms supporting the bales of trash. The system contemplates a threaded rod 120 mounted between supports 121 and 122, support 122 having mounting brackets 123 and 124 and further rotating drive member 125. A pusher member 126 is hingedly mounted to an attachment 127 which, in turn, is adapted to threadably mount on the rod 120 and move therealong. The pusher member 126 is adapted to pivot in accordance with the arrow 128 such that when the member 126 is propelled in the direction of arrow 129 it will push a parcel in front of it but when the member 126 is retracted it will fold up to ride over any intervening parcels and reposition itself, urged by spring 127a, on the rear side of another parcel so that when the direction of travel is again reversed it will become a pusher once again.

Figure 5:
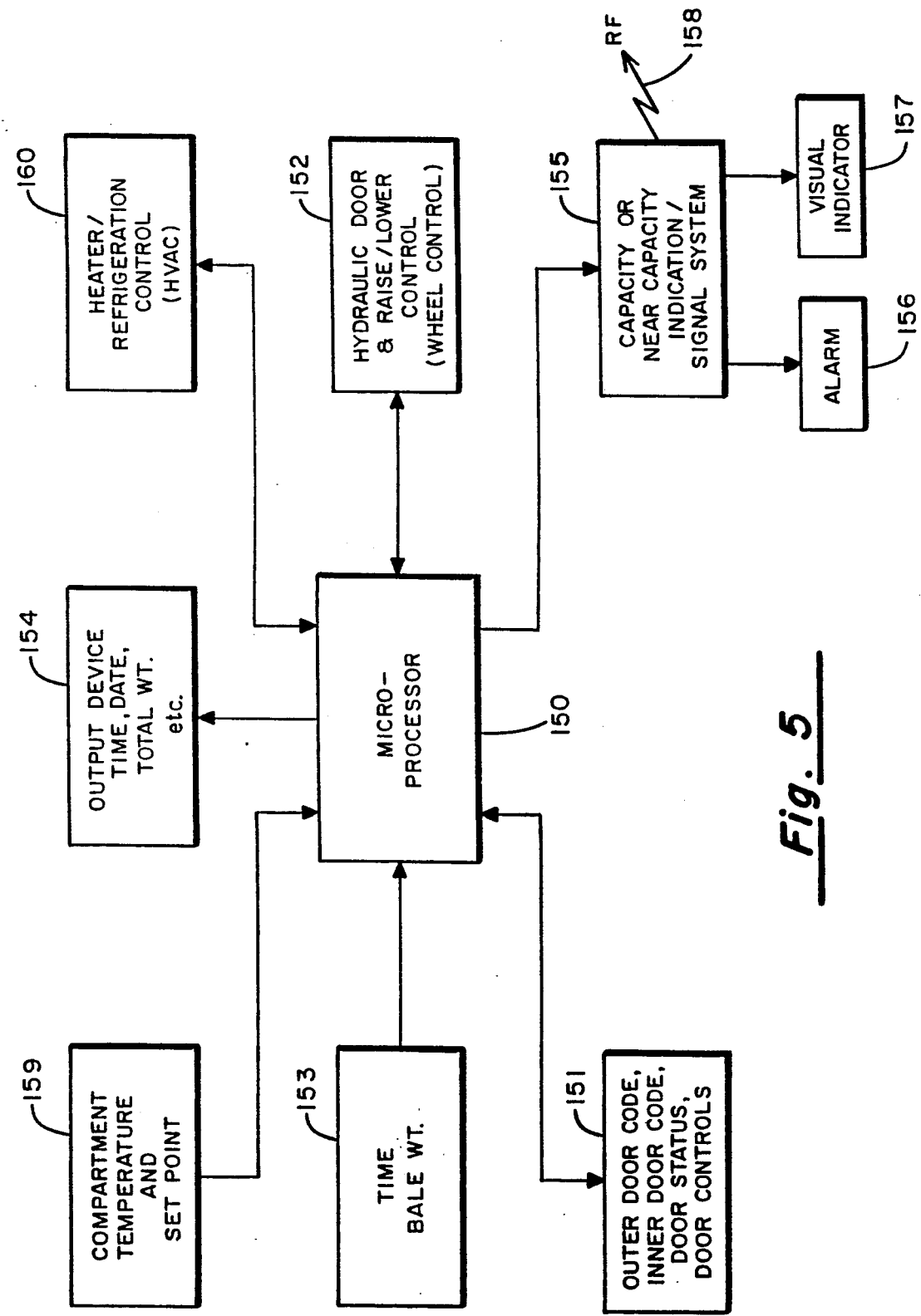
FIG. 5 is schematic diagram of a control system which may be used with the invention.

FIG. 5 illustrates a typical control schematic for use with the through-the-wall trash handling and storage system of the invention. The system might be microprocessor controlled as at 150 and includes door access loading and unloading controls as at 151 which coordinates with door operating controls as at 152 together with controls for operating the pivoting mechanism. Input data for loading the trash is illustrated at 153 and output functions are illustrated at 154, 155, 156 and 157. Thus the date, time, weight, type and any other data required or desired for each parcel loaded into the system are inputed at 153 and may be outputed in any desired way as by 154 which may, for example, include a printer. The load status of the container is indicated at 155 and an alarm or visual indicator may be provided together with a radio frequency (RF) signal which may be transmitted directly to alert a hauler as at 158. Controls for the space conditioning means are illustrated by 159 and 160 in which the required set point is inputed to the microprocessor which initiates the corresponding control for the refrigeration or heating unit as shown at 160. The control system also contemplates being interrogated by a hauler if desired to access the status of the container related to a need for pick up.

What is claimed is:

1. A method of handling and storing refuse prior to the disposal thereof utilizing a continuous system comprising the steps of:
   sequentially processing the refuse into a plurality of separately handleable portions of predetermined size;
   sequentially loading each separately handleable portion of refuse into the inlet door of an elongated storage container connecting limited access, normally closed inlet and outlet doors and defining a storage volume therebetween, the inlet and outlet doors further being mechanized and adapted to open and receive and discharge, respectively, the portions of refuse;
   sequentially moving each portion of refuse into and within the storage container and positioning each portion of refuse in the storage volume of the container by means of continuous conveying means;
   retaining the portions of refuse in the container until discharged;
   providing auxiliary space conditioning of the storage volume of the container in the form of temperature modifications to retard deterioration of the refuse;
   causing the outlet access to address the inlet of a refuse hauling vehicle; and
   discharging the portions of refuse from the storage container through the outlet door thereof into the refuse hauling truck utilizing continuous conveying means.

2. The method of claim 1 wherein the access to the operation of the outlet door is limited by a means selected from an encrypted code and a key.

3. The method of claim 1 wherein the access to the operation inlet and outlet doors is limited by a means selected from an encrypted code and a key.

4. The method of claim 1 wherein the access to the operation of the inlet and outlet doors is limited by a remotely accessible encrypted code.

5. The method of claim 1 comprising the additional steps of:
   pre-sorting recyclable trash contained in the refuse into categories requiring separate treatment;
   compacting the recyclable trash into parcels according to each separate category;
   loading the parcels into the container for receiving and storing trash in a manner which indexes the relevant category of recyclable trash.

6. The method of claim 1 further comprising the steps of:
   maintaining information including an ongoing count of the number of portions of trash discharged and the number of portions of trash in the container; and
   automatically communicating the need for discharging trash from the container when said container reaches a predetermined capacity.

7. The method of claim 6 further comprising the step of automatically maintaining and accumulating an ongoing account of the amount of trash removed from said container each time trash is hauled away.

8. The method of claim 6 wherein the access to the operation of the inlet and outlet doors is limited by a remotely accessible encrypted code and wherein the remote accessing of the container further comprises the ability of a hauler to access storage data relative to the status of the contents of the container.

9. The method of claim 1 wherein the step of providing auxiliary space conditioning includes maintaining the trash at a temperature above the freezing point of the trash.

10. A method of handling and storing refuse prior to the disposal thereof utilizing a continuous system comprising the steps of:
compacting the refuse into separate parcels;
transferring the compacted parcels to a vertically adjustable loading means;
elevating the parcels to the height required for transfer to an inlet transfer conveyor means associated with an elongated storage container, the container further having mechanized, limited access, normally closed inlet and outlet doors and defining an elongated storage volume between the inlet and outlet doors;
accessing and opening a limited access inlet door;
transferring the parcels through the inlet door via the inlet transfer conveyor means;
transferring the parcels from the inlet transfer conveyor means to a storage conveyor means in the elongated storage container;
conveying the parcels of refuse along within the storage volume of the storage container supported by the storage conveyor means;
retaining the parcels of refuse in the container as required as until discharged;
providing auxiliary space conditioning including refrigeration in the storage volume to retard deterioration of the refuse;
aligning the outlet door proximate the inlet of a refuse hauling vehicle;
accessing and opening the normally closed outlet door; and
discharging the parcels of refuse from the outlet access by conveying them to the end of a conveyor means.

11. The method of claim 10 wherein the access to the operation of the outlet door is limited by a means selected from an encrypted code and a key.

12. The method of claim 10 wherein the access to the operation inlet and outlet doors is limited by a means selected from an encrypted code and a key.

13. The method of claim 10 wherein the access to the operation of the inlet and outlet doors is limited by a remotely accessible encrypted code.

14. The method of claim 10 comprising the additional steps of:
pre-sorting recyclable trash contained in the refuse into categories requiring separate treatment;
compacting the recyclable trash into parcels according to each separate category;
loading the parcels into the container for receiving and storing trash in a manner which indexes the relevant category of recyclable trash.

15. The method of claim 10 further comprising the steps of:
maintaining information including an ongoing count of the number of portions of trash discharged and the number of portions of trash in the container; and
automatically communicating the need for discharging trash from the container when said container reaches a predetermined capacity.

16. The method of claim 15 further comprising the step of automatically maintaining and accumulating an ongoing account of the amount of trash removed from said container each time trash is hauled away.

17. The method of claim 15 wherein the access to the operation of the inlet and outlet doors is limited by a remotely accessible encrypted code and wherein the remote accessing of the container further comprises the ability of a hauler to access storage data relative to the status of the contents of the container.

18. The method of claim 10 wherein the step of providing auxiliary space conditioning includes maintaining the trash at a temperature above the freezing point of the trash.

19. A method of handling and storing refuse prior to the disposal thereof comprising the steps of:
sequentially processing the refuse into a plurality of sequentially loading each separately handleable portion of refuse into the inlet door of an elongated storage container having limited access, normally closed inlet and outlet doors and defining a storage volume therebetween, the inlet door being adapted to open and receive the portions of refuse;
sequentially moving each portion of refuse into and within the storage container and positioning each portion of refuse in the storage volume of the container by means of continuous conveying means;
providing auxiliary space conditioning of the storage volume of the container in the form of temperature modifications to retard deterioration of the refuse;
causing the outlet access to address the inlet of a refuse hauling vehicle;
discharging the portions of refuse from the storage container through the outlet access thereof into the refuse hauling truck utilizing continuous conveying means;
automatically gathering data by counting and monitoring the portions received in and discharged from the storage container thereby monitoring the number of portions contained within the storage volume on an ongoing basis;
providing an output indicative of the data gathered including the status of the number of portions contained within the storage volume; and
making data gathered relating to the need for collection remotely accessible to a hauler.

20. The method of claim 19 wherein the step of providing auxiliary space conditioning in the storage volume includes maintaining the trash at a temperature above the freezing point of the trash.

* * * * *

UNITED STATES PATENT AND TRADEMARK OFFICE
CERTIFICATE OF CORRECTION

PATENT NO. : 5 092 233
DATED : March 3, 1992
INVENTOR(S) : Anthony Fox

It is certified that error appears in the above-identified patent and that said Letters Patent is hereby corrected as shown below:

In column 10, line 29, after "of", insert -- separately handleable portions of predetermined size; -- .

Signed and Sealed this

Eleventh Day of May, 1993

Attest:

MICHAEL K. KIRK

Attesting Officer

Acting Commissioner of Patents and Trademarks